US012793466B2

(12) United States Patent
Chouraqui

(10) Patent No.: US 12,793,466 B2
(45) Date of Patent: Nov. 10, 2026

(54) SYSTEM AND METHOD FOR CHARACTERIZING DROOPY EYELID

(71) Applicant: MOR RESEARCH APPLICATIONS LTD., Ramat Gan (IL)

(72) Inventor: Menahem Chouraqui, Tel Aviv (IL)

(73) Assignee: MOR RESEARCH APPLICATIONS LTD., Ramat Gan (IL)

( * ) Notice: Subject to any disclaimer, the term of this patent is extended or adjusted under 35 U.S.C. 154(b) by 440 days.

(21) Appl. No.: 18/009,798

(22) PCT Filed: Jun. 21, 2021

(86) PCT No.: PCT/IB2021/055451

§ 371 (c)(1),
(2) Date: Dec. 12, 2022

(87) PCT Pub. No.: WO2021/260526

PCT Pub. Date: Dec. 30, 2021

(65) Prior Publication Data

US 2023/0237848 A1 Jul. 27, 2023

(30) Foreign Application Priority Data

Jun. 23, 2020 (WO) .................. PCT/IB2020/055938

(51) Int. Cl.
*G06V 40/18* (2022.01)
*G06Q 40/08* (2012.01)
(Continued)

(52) U.S. Cl.
CPC ........... *G06V 40/197* (2022.01); *G06Q 40/08* (2013.01); *G06V 10/70* (2022.01); *G06V 40/171* (2022.01)

(58) Field of Classification Search
CPC .... G06V 40/197; G06V 10/70; G06V 40/171; G06Q 40/08; A61B 3/14; A61B 3/10; A61B 3/11; A61B 3/112
See application file for complete search history.

(56) References Cited

U.S. PATENT DOCUMENTS 6,247,812 B1 * 6/2001 Miehle .................... A61B 3/10 351/206
10,575,726 B2 * 3/2020 Wetzel ................ A61B 5/1103
(Continued)

FOREIGN PATENT DOCUMENTS

CN 107918491 A 4/2018
KR 20030087101 A 11/2003
(Continued)

OTHER PUBLICATIONS

PCT International Search Report and Written Opinion for International Application No. PCT/IB2021/055451, mailed Oct. 13, 2021, 16pp.

(Continued)

*Primary Examiner* — Wesley J Tucker
(74) *Attorney, Agent, or Firm* — The Roy Gross Law Firm, LLC; Roy D. Gross

(57) ABSTRACT

Embodiments pertain to a method for characterizing a droopy upper eyelid performed on a computer having a processor, memory, and one or more code sets stored in the memory and executed in the processor. The method may comprise capturing an image of a patient's facial features comprising an eye and a droopy upper eyelid; identifying at least one geometric feature of a pupil of the eye within the image; and determining, based on the at least one geometric feature, whether the droopy upper eyelid is vision impairing or not, or whether the droopy upper eyelid is more likely vision impairing than not vision-impairing.

20 Claims, 5 Drawing Sheets

(51) Int. Cl.
*G06V 10/70* (2022.01)
*G06V 40/16* (2022.01)

(56) References Cited

U.S. PATENT DOCUMENTS

| | | | | |
|---|---|---|---|---|
| 2001/0056228 | A1* | 12/2001 | Utsugi | A61B 5/0013 600/300 |
| 2002/0064302 | A1 | 5/2002 | Massengill | |
| 2008/0243547 | A1 | 10/2008 | Brett et al. | |
| 2009/0089081 | A1 | 4/2009 | Haddad | |
| 2012/0078831 | A1 | 3/2012 | Newcott | |
| 2015/0109427 | A1 | 4/2015 | Wood et al. | |
| 2016/0025971 | A1* | 1/2016 | Crow | A61B 3/113 345/156 |
| 2016/0082130 | A1* | 3/2016 | Panosyan | A61B 5/4035 424/9.1 |
| 2016/0140390 | A1* | 5/2016 | Ghosh | G06T 7/20 348/78 |
| 2016/0287337 | A1 | 10/2016 | Aram et al. | |
| 2017/0053165 | A1* | 2/2017 | Kaehler | G06V 40/193 |
| 2017/0196446 | A1* | 7/2017 | Yashiv | A61B 3/10 |
| 2017/0215967 | A1 | 8/2017 | Spath | |
| 2018/0161098 | A1 | 6/2018 | Gupta et al. | |
| 2018/0296320 | A1 | 10/2018 | Gupta et al. | |
| 2019/0000808 | A1* | 1/2019 | Bosworth | A61P 25/02 |
| 2019/0191995 | A1* | 6/2019 | Giovinazzo | A61B 3/113 |
| 2019/0370959 | A1* | 12/2019 | Krishna | G06T 7/60 |
| 2021/0298595 | A1 | 9/2021 | Lai et al. | |
| 2022/0176970 | A1* | 6/2022 | Walsh | G06V 40/18 |
| 2022/0369921 | A1* | 11/2022 | Sakurada | A61B 3/0285 |
| 2024/0394879 | A1* | 11/2024 | Garbey | G06T 7/246 |
| 2025/0009225 | A1* | 1/2025 | Brough | G16H 50/30 |

FOREIGN PATENT DOCUMENTS

| | | | |
|---|---|---|---|
| KR | 20190105486 | A | 9/2019 |
| WO | 2015097183 | A2 | 7/2015 |
| WO | 2020019286 | A1 | 1/2020 |

OTHER PUBLICATIONS

Incesu, A.I., Tests for malingering in ophthalmology. Int J Ophthalmol. Oct. 18, 2013;6(5):708-17. doi: 10.3980/j.issn.2222-3959.2013.05.30. PMID: 24195054; PMCID: PMC3808926.

European Patent Office, Supplementary European Search Report for European Patent Application EP 21828467, dated Nov. 6, 2023, 19 pp.

Extended European Search Report for European Application No. EP21828467, mailed Nov. 6, 2023, 07 Pages.

Communication pursuant to Article 94(3) EPC for European Application No. EP21828467, mailed on Nov. 20, 2025, 7 pages.

Israel Office Action for Patent Application No. 299087 dated Jun. 4, 2025, 06 pages.

* cited by examiner

SYSTEM AND METHOD FOR CHARACTERIZING DROOPY EYELID

CROSS-REFERENCE TO RELATED APPLICATIONS

This application is a National Phase of PCT Patent Application No. PCT/IB2021/055451 having International filing date of Jun. 21, 2021, which claims priority from PCT/IB2020/055938 filed on Jun. 23, 2020, the contents of which are all expressly incorporated herein by reference in their entirety.

BACKGROUND

Ptosis describes sagging or prolapse of an organ or part, including droopy upper eyelid, also known as Blepharoptosis or Blepharochalasis. For medical or aesthetic reasons it may be desirable to treat a patient having a droopy upper eyelid. Medical reasons include impaired vision. Purely aesthetically unpleasing droopy eyelid does not impair vision of the patient.

The severity of eyelid prolapse defines the nature of the corrective surgery as either medical or aesthetic. The classification has consequences regarding insurance and logistical issues.

Typically, this distinction has been defined through a visual evaluation of a patient's droopy eyelid.

BRIEF DESCRIPTION OF THE DRAWINGS

The subject matter regarded as the invention is particularly pointed out and distinctly claimed in the concluding portion of the specification. The invention is best understood in view of the accompanying drawings in which:

Figures 1A, 1B:
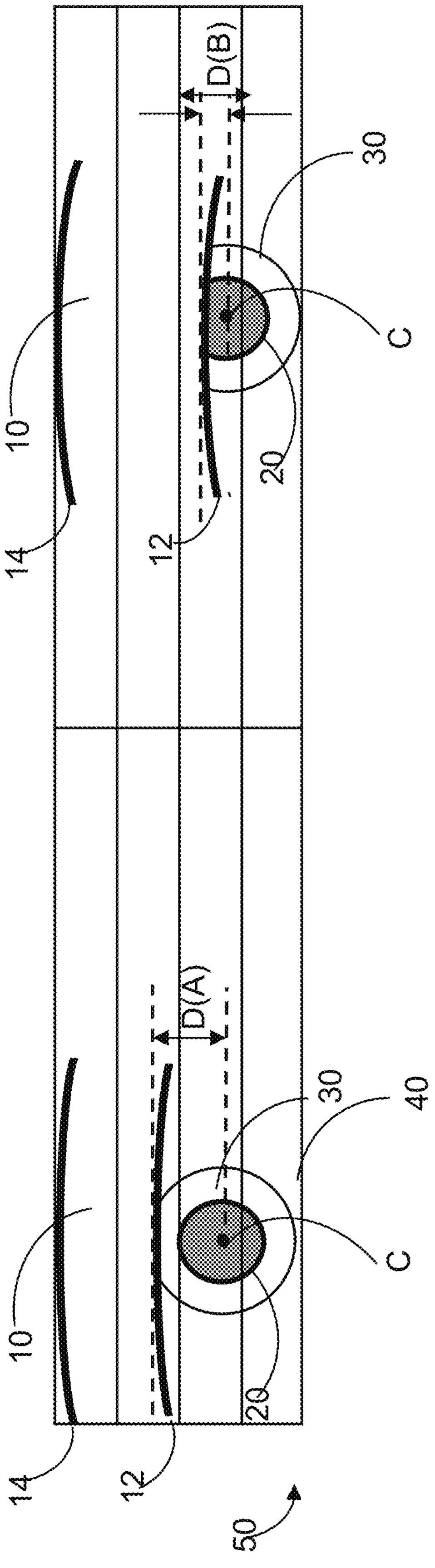
FIGS. 1A-B depict a series of frontal schematic views of a droopy (ptotic) upper eyelid, according to an embodiment.

It will be appreciated that for the sake of clarity, elements shown in the figures may not be drawn to scale and reference numerals may be repeated in different figures to indicate corresponding or analogous elements.

DETAILED DESCRIPTION

The following description, certain details are set forth to facilitate understanding; however, it should be understood by those skilled in the art that the present invention may be practiced without these specific details. Furthermore, well-known methods, procedures, and components have not been omitted to highlight the invention.

Visual characterization of droopy eyelids is subjective in nature and are often inaccurate. Therefore, there is a need for a system and method for objective and accurate differentiation between aesthetic and vision-impairing droopy eyelid.

Embodiments pertain to a droopy upper eyelid evaluation system operative to differentiate between aesthetical and vision impairing ptosis by identifying, for subject (also: patient) a degree unaided prolapse of the upper eyelid, based on facial image data of the patient. In some embodiments, the droopy upper eyelid evaluation system is configured and/or operable to automatically or semi-automatically evaluate or characterize, based on facial image data of the patient, a droopy eyelid condition for one or both eyes of a patient, simultaneously or separately.

In some embodiments, the evaluation system is operable to determine, facial image data of the patient, whether the subject is making attempts to malinger a droopy eyelid in general and, optionally, a vision-impairing droopy eyelid in particular. In some examples, the evaluation system is operable to determine, facial image data of the patient, whether the subject is making attempts to forcefully exaggerate a pre-existing, merely aesthetic droopy eyelid to become, at the time of the patient evaluation, a vision-impairing droopy eyelid.

In some examples, the evaluation system may employ a rule-based engine and/or artificial intelligence functionalities which are based, for example, on a machine learning model. The machine learning model may be trained by a multiplicity of facial image data of patients. The rule-based engine and/or the machine learning model are configured to determine whether a patient is malingering a droopy eyelid or not. In some embodiments, the rule-based engine and/or the machine learning model are configured to distinguish, based in the patient's facial image data, between malingered or non-malingered vision-impairing droopy eyelids. The patient's image data may be a sequence of images captured in a video recording session.

In some embodiments, a rule-based engine may be employed for determining whether the patient's droopy eyelid condition is aesthetical in nature or vision-impairing. A machine learning algorithm may then be employed for characterizing the vision-impairing droopy eyelid condition, for example, as malingered or not.

In some embodiments, a machine learning algorithm may first be employed to determine whether the patient is making attempts to malinger a droopy eyelid condition or not. After the evaluation system has determined that the patient is not making attempts to malinger a droopy eyelid condition, the evaluation system employs a rule-based engine for determining whether a detected droopy eyelid condition is vision-impairing or not (i.e., merely aesthetical in nature).

Turning now to the figures, FIGS. 1A-1B schematically depict a series of frontal schematic views of a droopy upper eyelid at different stages of a prolapse. As shown in FIG. 1A, eyelid 10 exhibits a first stage of prolapse in which eyelid 10 covers a relatively small portion of iris 30 but does not cover pupil 20 and therefore could be characterized (e.g., classified) as an aesthetic case of droopy eyelid. The situation shown schematically in FIG. 1B embodies a more advanced case of prolapse in which it covers a significant portion of iris 30 as well as of pupil 20. Accordingly, the stage of prolapse or upper droopy eyelid depicted in FIG. 1B may be characterized (e.g., classified) as vision impairing, for example, according to one or more criteria described herein. In some examples, different criteria may be applied to different population groups (e.g., gender, age, race, etc.).

In some embodiments, one or more criteria may pertain to (e.g., geometric) facial features of a patient such as, for example, a distance between a center of a patient's pupil and, for the same eye, a feature of the patient's upper eyelid including, for example, the lower central edge of the patient's upper eyelid.

It is noted that characterizing (e.g., classifying) a droopy upper eyelid may also encompass characterizing whether droopy upper eyelid is more likely vision impairing than not. For example, the system may be operable to determine a probability of vision-impairing droopy eyelid. In a further example, the system may be operable to determine a probability of obstructive or non-obstructive upper eyelid.

In some embodiments, grid 50 overlays the images in certain embodiments. Grid 50 facilitates machine (e.g., automated) detection of various degrees of eyelid prolapse that could be indicative of patient malingering, since a degree of prolapse is expected to remain within a certain range, or remain constant within the time frame needed to capture a series of images, for example, within different light settings. It should be noted that grid 50 in a certain embodiment is not displayed and is implemented as an internal coordinate system providing a basis of reference for tracking the degree of eyelid prolapse, for instance, over a certain period of time.

In some embodiments, additional facial features may be captured by a camera and processed to determine, for example, whether the patient is trying to exaggerate droopy upper eyelid to malinger vision-impairing. Such facial features can pertain, for example, comparison to the patient's other eye, facial expressions and/or movements of the patient's mouth, eyebrows, cheekbones and/or forehead.

For instance, patient malingering (or lack thereof) may for example be detected by an evaluation system based on artificial intelligence functionalities which are based on a machine learning model (e.g., an artificial neural network and/or other deep learning machine learning models; regression-based analysis; a decision tree; and/or the like), and/or by a rule-based engine. For example, the evaluation system may be configured to analyze image data descriptive of a patient's facial muscle features, muscle activation, facial expressions, and/or the like, and provide an output indicating whether the patient is malingering a vision-impairing droopy eyelid, or not. For example, a machine learning model may be trained with images of video sequences of facial expressions, labelled by an expert either as "malingering" or "not malingering".

In some examples, a droopy eyelid may be classified by comparing features of one eye with features of the other eye of the same patient, e.g., by analyzing the patient's facial muscle features, muscle activation, facial expressions, and/or the like.

In some embodiments, a criteria for characterizing (e.g., classifying) a droopy upper eyelid as vision impairing or as not vision-obstructive may be based on measuring a distance D between a center C of pupil 20 and a feature of eyelid 10 such as, for example, lower central edge of the upper eyelid 12. This distance may herein also be referred to as Marginal Reflex Distance Test 1 or MRD1. The position of center C of pupil 20 in a captured image frame may be determined based on light reflected from the pupil. Merely for the sake of clarity, the distances D(A) and D(B) are respectively depicted in FIGS. 1A and 1B.

In some examples, if MRD1 is <2 mm or 2 mm, the droopy upper eyelid may be characterized as vision-impairing justifying, e.g., coverage and/or reimbursements of the costs of a medical procedure to treat the vision-impairing droopy eyelid for example through corrective surgery. Otherwise, the droopy upper eyelid may be characterized as a (purely) aesthetic problem, not necessarily justifying coverage and/or reimbursement of the costs of a medical procedure for treatment thereof.

Optionally, a criterion may also relate to a geometric feature of the imaged pupil 20. The geometric feature may include, for example, a contour of the portion of pupil 20 that is visually non-impaired; the pupil area that is visible in the image; entire pupil area, diameter and/or radius when not impaired by the patient's eyelid; pupil diameter; pupil curvature and/or the like.

In some embodiments, the droopy upper eyelid evaluation system may be adapted to determine parameter values of a geometric feature of a pupil even if the pupil is not fully visible in the captured image. For example, the droopy upper eyelid evaluation system may complement parameter values of non-visible geometric features, e.g., based geometric features of the pupil that are visible. For instance, the entire pupil area may be determined based on the partially visible portion of the pupil.

Optionally, data descriptive of a geometric reference object relating to, for example, the entire pupil area may be generated. The geometric reference object may be used as reference for droopy upper eyelid characterization (e.g., classification). The geometric reference object may be a circular object indicating the contour of the entire pupil area. Characteristics of the circular object may be compared against characteristics of the visible pupil portion for differentiating between (purely) aesthetic and vision impairing droopy upper eyelid.

Figure 2:
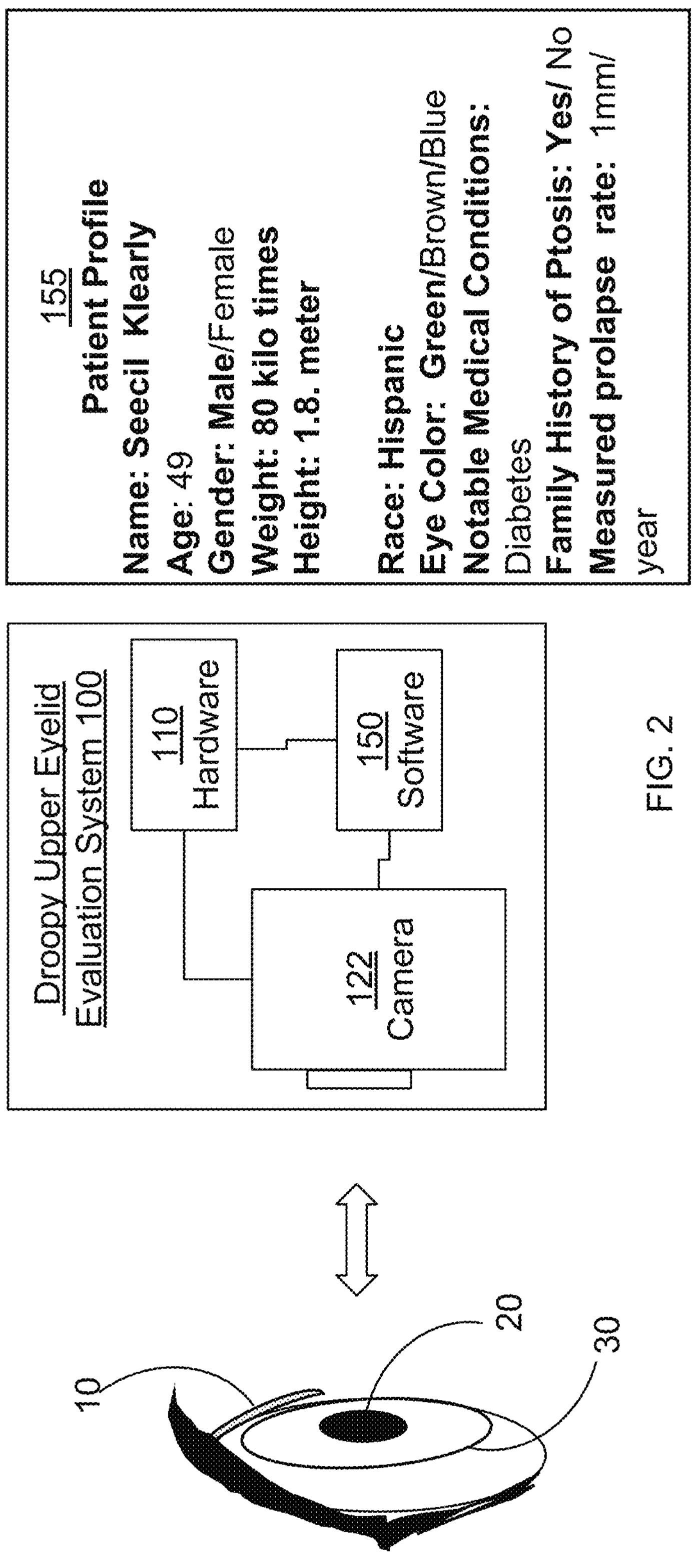
FIG. 2 is a schematic depiction of image capture of a droopy upper eyelid by an evaluation system, for a patient having a certain patient profile, according to an embodiment.

FIG. 2 is a schematic depiction of image capture for a patient having a certain patient profile, according to some embodiments. Generally speaking, system 100 may include a camera 122 linked to computer hardware 110 and algorithm code 158 operative to capture one or more images of an eye and its droopy upper eyelid under common light conditions and viewing angle.

In some embodiments, different imaging parameter values may be selected for capturing a patient's region of interest (ROI). For example, images of a facial ROI of the patient may be captured (e.g., through video) in the visible wavelength range and/or in the infrared wavelength range to generate one or more frames of facial image data for conducting droopy upper eyelid characterization (e.g., classification). The frame may be captured from different distances, field of views (FOVs), viewing angles, at different imaging resolutions, under different light conditions, etc.

In some embodiments, the ROI may not only include the patient's eye or eyes, but also additional portions of the patient face such as the forehead, nose, cheek, etc., for example, to capture and analyze the patient's facial muscle movement. Capturing images of the patient's face may facilitate determining whether a patient's attempts to malinger or fake vision-impairing droopy eyelid, or not. In some examples, the ROI may also include non-facial portions, for instance, to capture a patient's body posture, which may also provide an indication whether a patient attempts to malinger vision-impairing droopy eyelid or not.

In some embodiments, imaging parameter values may be standardized to ensure that droopy upper eyelid characterization (e.g., classification) is performed in standardized manner for any patient.

In some embodiments, facial image data may be processed and/or analyzed with a variety of processing and/or analysis techniques including, for example, edge detection, high-pass filtering, low-pass filtering, deblurring, edge detection, and/or the like.

In some embodiments, the patient profile may be used to search population data (e.g., inter-subject measurement data) having similar profiles as the patient to determine the likelihood of vision impairing droopy upper eyelid, patient malingering, on the basis of common prolapse rates found among data of a population.

In some embodiments, historic same-patient data (e.g., intra-subject measurement data) may be used to determine, for example, the likelihood of vision impairing and/or patient malingering.

In some embodiments, the droopy upper eyelid evaluation system may be operable to identify relevant demographic and/or health parameters conducive in evaluating if the aesthetic prolapse will advance into a case of vision impairing droopy eyelid or will remain vision non-obstructive. Optionally, artificial intelligence techniques may be employed for identifying relevant demographic and/or health parameters conducive in evaluating if the prolapse will advance into a case of vision impairing or will remain a vision non-obstructive droopy eyelid.

In some embodiments, a droopy upper eyelid evaluation system 100 may provide a user of the system with indicators (e.g., visual and/or auditory) regarding a desired patient head orientation and, optionally, body posture, relative to camera 122 during the capturing of images of one or more facial features of the patient. For example, droopy upper eyelid evaluation system 100 may provide reference markings to indicate a desired yaw, pitch and/or roll orientation of the patient's head relative to camera 122. Capturing facial features at a desired head orientation may for example reduce, minimize or eliminate the probability of false positives (i.e., that the droopy eyelid is vision impairing) and/or of false negatives (that droopy eyelid is not vision impairing).

Figure 3:
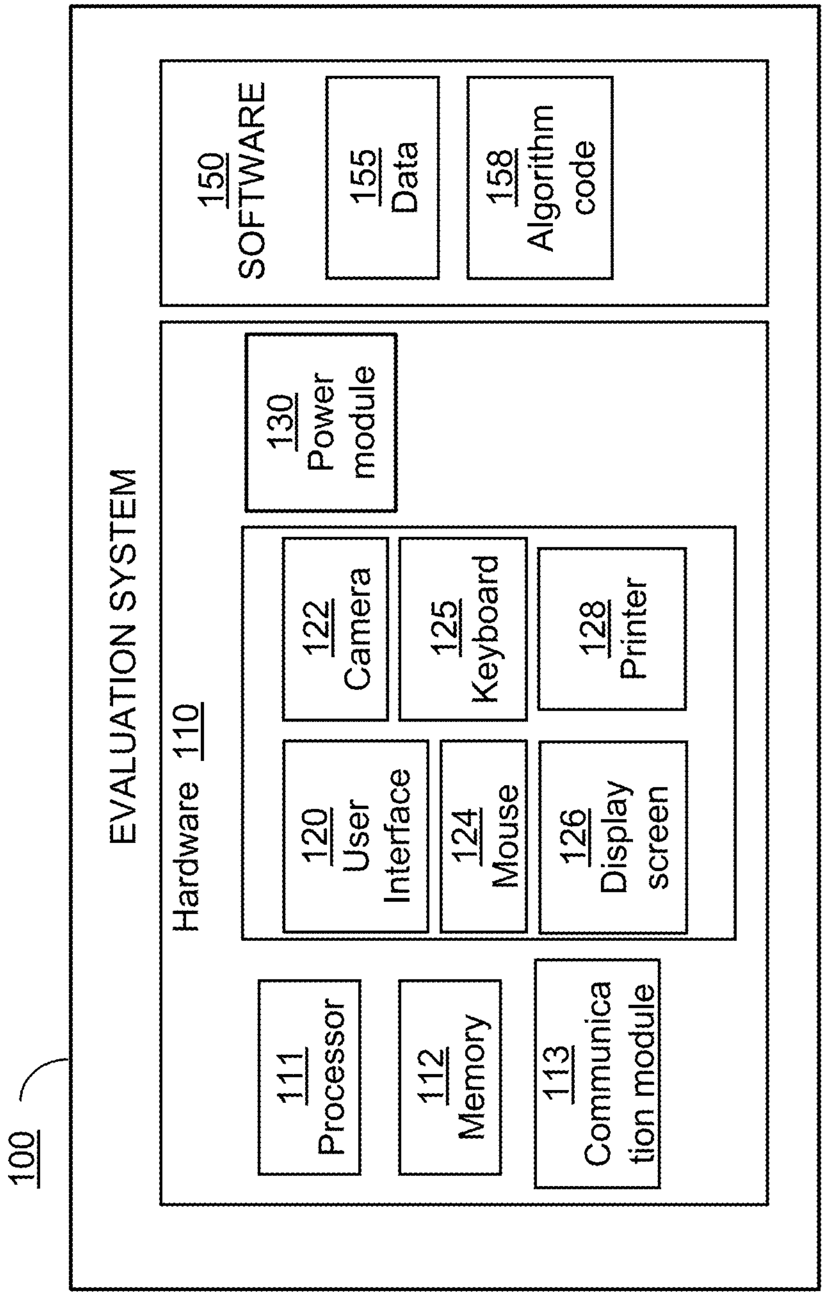
FIG. 3 is a schematic block diagram of the droopy upper eyelid evaluation system, according to an embodiment.

FIG. 3 is a schematic block diagram of droopy upper eyelid evaluation system 100 including for example, hardware 110, comprising a processor 111, short term and/or long term memory 112, a communication module 113 and user interface devices 120 like a camera 122, mouse 124, keyboard 125, display screen 126 and/or printer 128. Droopy upper eyelid evaluation system 100 also includes software 150 in the form of data 155 and algorithm code 158. Algorithm code 158 may for instance include search, rule-based and/or machine learning algorithms employed (e.g., for using population data) to characterize (e.g., classify) a droopy eyelid.

In some embodiments, face detection or facial feature detection algorithms may be employed for characterizing (e.g., classifying) a droopy upper eyelid.

Communication module 113 may, for example, include I/O device drivers (not shown) and network interface drivers (not shown) for enabling the transmission and/or reception of data over a network. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G, 5G, 6G mobile networks, 3GPP, LTE, LTE advanced, Bluetooth® (e.g., Bluetooth smart), ZigBee™, near-field communication (NFC) and/or any other current or future communication network, standard, and/or system. Evaluation system 100 may further include a power module 130 configured to power the various components of the system. Power module 130 may comprise an internal power supply (e.g., a rechargeable battery) and/or an interface for allowing connection to an external power supply.

Figure 4A:
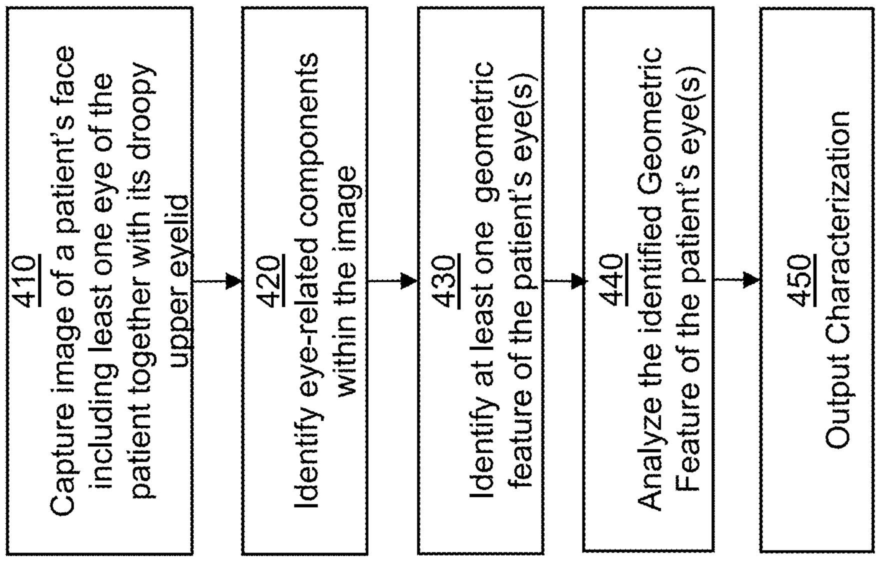
FIGS. 4A-B are flow charts depicting processing steps for determining whether the prolapse of the droopy upper eyelid is vision impairing or not, according to an embodiment.

FIG. 4A is a flow chart depicting processing steps employed by the droopy upper eyelid evaluation system 100 of FIG. 3 for characterizing (e.g., classifying) the prolapse of a droopy eyelid as vision impairing or not vision-impairing, according to an embodiment.

As shown, in step 410 the system captures one or more images of a patient's face including at least one eye of the patient together with its droopy upper eyelid.

In step 420, the system identifies eye-related and, optionally, additional facial features. For example, the system identifies the iris 30 and pupil 20 as shown in FIG. 1 within the image using image or facial feature recognition techniques, which may be rule-based and/or based on machine learning models or algorithms.

In step 430, the system identifies (e.g., calculates) one or more geometric feature of the patient's eye(s). Such features include, inter alia, pupil diameter, pupil area, pupil curvature, center C of pupil 20 and/or a feature of eyelid 10 such as, for example, lower central edge of the upper eyelid 12, pupillary distance, and/or the like.

In step 440, the system analyzes a geometric feature of the eye.

In step 450, the system determines, based on the analysis, whether the droopy upper eyelid is vision impairing or not.

Figure 4B:
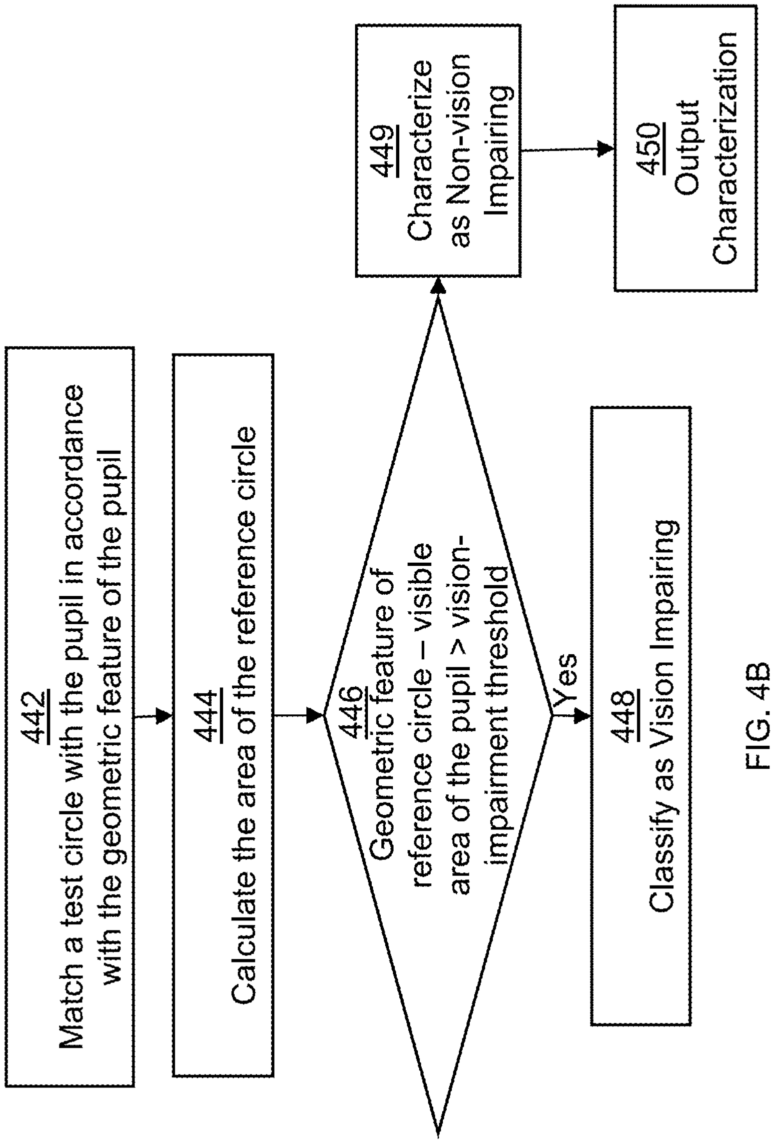

In some embodiments, step 440 of analyzing a geometric feature of the eye may comprise determining a distance between a center C of pupil 20 and a feature of eyelid 10 such as, for example, lower central edge of the upper eyelid 12. As mentioned herein, the distance D may herein also be referred to as Marginal Reflex Distance Test 1 or MRD1. The position of center C of pupil 20 in a captured image frame may be determined based on light reflected from the pupil. Merely for the sake of clarity, the distances D(A) and D(B) are respectively depicted in FIGS. 1A and 1B Further referring to FIG. 4B, in some embodiments, step 440 of comparing a geometric reference object with a geometric characteristic of the pupil may comprise matching a test circle with the pupil in accordance with the geometric feature of the pupil (step 442).

The method may then include, for example, calculating the area of the reference circle (step 444) for determining the difference between the area of the reference circle and the area of the visible part of the imaged pupil (step 446).

If the difference exceeds a vision-impairment threshold value, the droopy upper eyelid is characterized as vision-impairing (step 448). If the difference does not exceed the vision-impairment threshold value, the patient's droopy upper eyelid is characterized as not vision-impairing (step 449). Droopy upper eyelid characterization may then be output (step 450).

In step 450 the droopy upper eyelid characterization may be output through an output device like a printer, display, speaker, or even to another computer in communication with the system.

Figure 5:
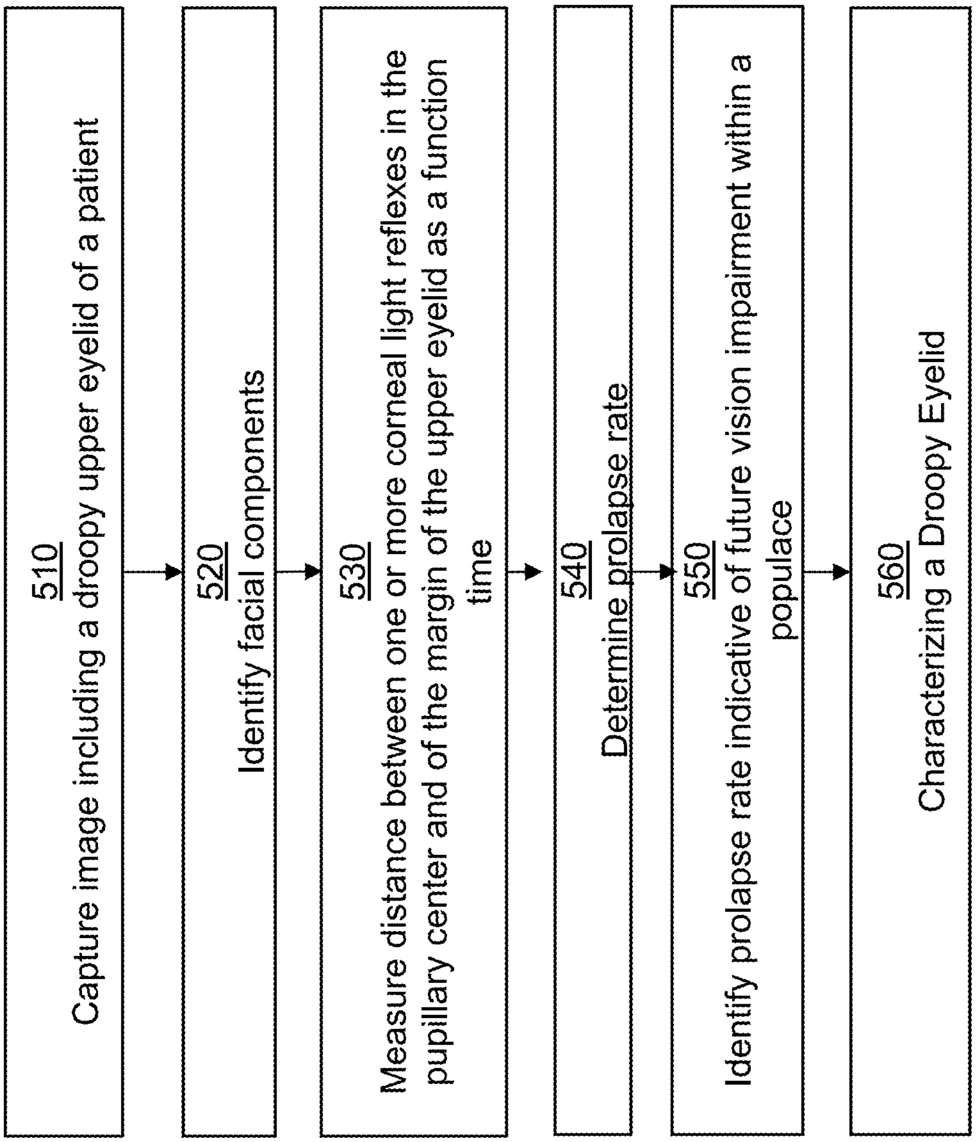
FIG. 5 is a flow chart depicting processing steps for determining the likelihood of occurrence of vision impairing ptosis, according to an embodiment.

Additional reference is made to FIG. 5, which depicts processing steps for a variant embodiment directed at identifying vision impairing at an early stage of prolapse when pupil 20 is entirely unobscured.

As shown, in step 510 a image of a droopy upper eyelid is captured, e.g., together with the retina and the pupil. As noted above, the image capture may be implemented in the same lighting conditions and angle of image capture.

In step 520, the system identifies facial components such as, for example, iris 30 and pupil 20, of FIG. 1, within the image using image recognition techniques, as noted above.

In step 530, the distance between the corneal light reflexes in the pupillary center and of the margin of the upper eyelid is automatically measured as a function of time, for example, continuously (e.g., by imagers comprised in glasses worn by the patient), at irregular or regular intervals like, once or several times a day, once a week, or once a month, or once a year, all in accordance with patient needs, e.g., to determine a statistical parameter value to evaluate, for example, whether the patient is malingering a droopy eyelid or not, e.g., by determining a deviation between measurements; and/or to determine a trend (also: disease progress) of the patient's droopy eyelid condition.

In step 540, a prolapse rate of the droopy upper eyelid is determined (e.g., calculated) on the basis of at least two images, each captured at a different time.

In step 550, the system identifies a prolapse rate indicative of future vision impairment within a population. For example, the system determines a statistical likelihood of the prolapse advancing into a state of vision impairing prolapse, for example, based on a database of droopy upper eyelid sufferers is searched for those having a history of a similar prolapse rate that advanced to an image impairing stage and/or based the patient's own prolapse rate may serve as a reference. In some examples, the system determines a statistical likelihood of future vision impairing based on the patient data. Optionally, additional demographic and/or health data are employed to better refine the search, in a certain embodiment.

In some embodiments, machine learning techniques employing, for example, Bayesian networks, artificial neural networks and/or other techniques proving such functionality, are employed to identify relevant parameters associated vision impairing and uses these parameters in the search.

In step 560, a present droopy eyelid is characterized, e.g., it is determined whether it has become vision-impairing or not, e.g., by implementing the steps outlined with respect to step 440.

In some embodiments, a series of images are captured in each of a variety of lighting conditions. The different lighting conditions compel a patient to open the eyes widely in low intensity lighting and squint in high intensity lighting. The variable light conditions make it more difficult for a patent to exaggerate eyelid prolapse.

The term "processor", as used herein, may additionally or alternatively refer to a controller. A processor may be implemented by various types of processor devices and/or processor architectures including, for example, embedded processors, communication processors, graphics processing unit (GPU)-accelerated computing, soft-core processors and/or general purpose processors.

According to some embodiments, memory 112 may include one or more types of computer-readable storage media. Memory 112 may include transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 112 may, for example, including, e.g., temporally-based and/or non-temporally based instructions. As long-term memory, memory 112 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

It will be appreciated that separate modules and/or components can be allocated for each of evaluation system 100. However, for simplicity and without be construed in a limiting manner, the description and claims may refer to a single module and/or component. For example, although processor 111 may be implemented by several processors, the following description will refer to processor 111 as the component that conducts all the necessary processing functions of system 100.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A, B, C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that the image data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

ADDITIONAL EXAMPLES

Example 1 includes a method for characterizing droopy upper eyelid performed on a computer having a processor, memory, and one or more code sets stored in the memory and executed in and/or by the processor, the method comprising:

- capturing at least one image of a patient's facial features to generate image data, the facial features comprising an eye having a pupil, and a droopy upper eyelid of the same eye;
- automatically determining, based on the image data, whether the droopy upper eyelid is vision impairing or not, or whether the droopy upper eyelid is more likely vision impairing than not vision-impairing.

Example 2 includes the subject matter of example 1 and, optionally, further comprising providing an output indicating whether the droopy upper eyelid is vision impairing or not, or whether the droopy upper eyelid is more likely vision impairing than not vision-impairing Example 3 includes the subject matter of example 1 and/or example 2 and, optionally, wherein the determining includes identifying at least one geometric feature of the pupil for determining, based on the at least one geometric feature, whether the droopy upper eyelid is vision impairing or not, or whether the droopy upper eyelid is more likely vision impairing than not vision-impairing.

Example 4 includes the subject matter of example 3 and, optionally, wherein the least one geometric feature of the pupil is the pupil diameter.

Example 5 includes the subject matter of example 3 or example 4 and, optionally, wherein the least one geometric feature of the pupil is the pupil curvature.

Example 6 includes the subject matter of any one or more of the Examples 3 to 5 and, optionally, wherein the at least one geometric feature of the pupil includes a pupil area visible in the image.

Example 7 includes the subject matter of example 6 and, optionally, wherein the determining is implemented through comparison of the pupil area to a circular geometric object having a diameter matching the diameter of the pupil.

Example 8 includes the subject matter of Examples 6 and/or 7 and, optionally, wherein the determining is implemented through comparison of the pupil area to a circle having a curvature matching the pupil curvature.

Example 9 includes the subject matter of any one or more of the examples 1 to 8 and, optionally, determining a distance D between a center C of the pupil and a feature of the upper eyelid.

Example 10 includes the subject matter of Example 9 and, optionally, wherein the feature of the upper eyelid is the lower central edge of the upper eyelid.

Example 11 includes the subject matter of any one or more of the Example 1 to 10 and, optionally, determining a Marginal Reflex Distance Test 1.

Example 12 includes the subject matter of any one or more of the Examples 7 to 11 and, optionally, wherein the position of center C of the pupil in a captured image frame may be determined based on light reflected from the pupil.

Example 13 includes the subject matter of any one or more of the examples 1 to 12 and, optionally further comprising characterizing a droopy eyelid as the result of patient malingering or not; or characterizing how likely the droopy eyelid is the result of patient malingering or not.

Example 14 includes the subject matter of any one or more of the examples 1 to 13 and, optionally, further comprising characterizing a vision-impairing droopy eyelid as being the result of patient malingering or not, or characterizing how likely the vision-impairing droopy eyelid is the result of patient malingering or no.

Example 15 includes the subject matter of example 14 and, optionally, wherein the characterizing of the vision-impairing droopy eyelid as being due to the result of patient malingering or not (or characterizing how likely the vision-impairing droopy eyelid is the result of patient malingering or not), is performed by a machine learning model implemented as an artificial neural network.

Example 16 pertains to a system for identifying vision-impairing droopy eyelid, the system comprising:

- a camera operative to capture an image of a patient's facial features comprising an eye and an associated droopy upper eyelid;
- a computer configured to:
- identify at least one geometric feature of the pupil of the eye within the image, determining whether the droopy upper eyelid is vision impairing or not vision-impairing in accordance with the at least one geometric feature; and an output device operative to provide an output indicative of whether the droopy upper eyelid is vision impairing or not vision-impairing.

Example 17 includes the subject matter of Example 16 and, optionally, wherein the least one geometric feature of the pupil is the pupil diameter.

Example 18 includes the subject matter of examples 16 and/or 17 and, optionally, wherein the least one geometric feature of the pupil is the pupil curvature.

Example 19 includes the subject matter of any one or more of the Examples 16 to 18 and, optionally, wherein the at least one geometric feature of the pupil includes a pupil area visible in the image.

Example 20 includes the subject matter of any one or more of the Examples 16 to 19 and, optionally, wherein the determining is implemented through comparison of the pupil area to a circular geometric object having a diameter matching the diameter of the pupil.

Example 21 includes the subject matter of any one or more of the Examples 16 to 20 and, optionally, wherein the determining is implemented through comparison of the pupil area to a circle having a curvature matching the pupil curvature.

Example 22 includes the subject matter of any one or more of the examples 16 to 21 and, optionally, wherein the determining comprises: determining a distance D between a center C of the pupil and a feature of the upper eyelid.

Example 23 includes the subject matter of Example 22 and, optionally, wherein the feature of the upper eyelid is the lower central edge of the upper eyelid.

Example 24 includes the subject matter of any one or more of examples 16 to 23 and, optionally, further comprises determining a Marginal Reflex Distance Test 1.

Example 25 includes the subject matter of any one or more of the examples 22 to 24 and, optionally, wherein the position of center C of the pupil in a captured image frame may be determined based on light reflected from the pupil.

Example 26 includes the subject matter of any one or more of the examples 16 to 25 and, optionally, further comprising characterizing a droopy eyelid as being due to patient malingering or not.

Example 27 includes the subject matter of any one or more of the examples 16 to 26 and, optionally, further comprising characterizing a vision-impairing droopy eyelid as being due to patient malingering or not.

Example 28 includes the subject matter of example 27 and, optionally, wherein the characterizing of the vision-impairing droopy eyelid as being due to patient malingering or not, is performed by a machine learning model implemented as an artificial neural network.

Example 29 includes a method for identifying vision-impairing droopy eyelid performed on a computer having a processor, memory, and one or more code sets stored in the memory and executed in the processor, the method comprising:

capturing a plurality of frontal images of an eye and an upper droopy eyelid, each of the images captured in a period of time exceeding one week;

identifying an uppermost pupil boundary within each of the images;

identifying a lowermost edge of a droopy upper eyelid within each of the images;

determining a rate of prolapse of the droopy upper eyelid;

identifying a population having a similar rate of prolapse;

characterizing the droopy upper eyelid in accordance with the population having a similar rate of prolapse; and providing an output descriptive of the characterizing of the droopy upper eyelid.

Example 30 includes the subject matter of example 29 and, optionally, wherein the output indicates whether the prolapse is due to patient malingering, or not.

Example 31 includes a system for identifying vision-impairing droopy eyelid, the system comprising a processor, memory, and one or more code sets stored in the memory and executed in the processor for performing:

capturing a plurality of frontal images of an eye and an upper droopy eyelid, each of the images captured in a period of time exceeding one week;

identifying an uppermost pupil boundary within each of the images;

identifying a lowermost edge of a droopy upper eyelid within each of the images;

determining a rate of prolapse of the droopy upper eyelid;

identifying a population having a similar rate of prolapse;

characterizing the droopy upper eyelid in accordance with the population having a similar rate of prolapse; and providing an output descriptive of the characterizing of the droopy upper eyelid.

Example 32 includes the subject matter of example 31 and, optionally, wherein the output indicates whether the prolapse is due to patient malingering, or not.

It should be appreciated that the droopy upper eyelid evaluation system embodies an advance in droopy upper eyelid analysis capable of providing a more reliable characterization of droopy upper eyelids and therefore can reduce, if not entirely eliminate, erroneous characterizations (e.g., classifications or evaluations). Erroneous characterization of aesthetic, not vision-impairing droopy upper eyelids as vision impairing causes medical resources, like physicians and operation rooms, to be directed to corrective, vision restoration surgery when indeed the procedure is entirely optional. Furthermore, insurance providers benefit in that the reliable characterization enables them to accurately apply policies that differentiate between crucial vision restoration and optional, aesthetic surgery. Furthermore, the system enables insurance providers to identify patient malingering directed to securing insurance funding for corrective surgery of a medical condition when in fact the desired surgery is an optional aesthetic procedure.

It should be appreciated that embodiments formed from combinations of features set forth in separate embodiments are also within the scope of the present invention.

While certain features of the invention have been illustrated and described herein, modifications, substitutions, and equivalents are included within the scope of the invention.

What is claimed is:

1. A system for characterizing, for a subject, a droopy upper eyelid, the system comprising:

a user interface device;

at least one processor;

at least one memory; and one or more code sets stored in the memory which, when executed by the processor, perform the following:

receiving, from at least one camera, image data descriptive of one or more facial features and of one or more body postures of the subject captured by the camera;

processing the image data by the at least one processor;

determining, based on the processing, whether the upper eyelid is droopy;

further determining, based on the processing of the image data, whether an eyelid identified as droopy is due to malingering of the subject or not; and providing, via the user interface device, an output indicative of whether the determined droopy upper eyelid is due to malingering of the subject or not.

2. The system of claim 1, wherein the determining of subject malingering is further performed by taking into consideration image data generated by capturing of the one or more facial features under low intensity and high intensity lighting conditions such to compel the subject to open the eyes widely under the low intensity lighting conditions and to squint under the high intensity lighting conditions.

3. The system of claim 1, wherein the determining comprises:

determining a distance D between a center C of the pupil and a feature of the upper eyelid.

4. The system of claim 1, wherein the processing of the image data is performed by one of the following:

a trained machine-learning (ML) model;

a rule-based model;

a deterministic model;

or any combination of the aforementioned.

5. A system for characterizing, for a subject, a droopy upper eyelid, the system comprising:

a user interface device;

at least one processor; and at least one memory storing software code portions executable by the at least one processor to cause the system to perform any one or more of the following steps:

providing indicators regarding a desired head orientation of the subject relative to the at least one camera during the capturing of images of one or more facial features of the subject for generating image data descriptive of the one or more facial features;

receiving, from at least one camera, image data descriptive of one or more facial features of the subject and of the head orientation of the subject captured by the camera;

processing the image data;

determining, based on the processing, whether the upper eyelid is droopy;

further determining, based on the processing of the image data, whether an eyelid identified as droopy is due to subject malingering or not; and providing, by the user interface device, an output that indicates whether the determined droopy upper eyelid is due to subject malingering or not.

6. The system of claim 5, wherein the determining whether the upper eyelid is droopy includes identifying at least one geometric feature of the pupil for determining, based on the at least one geometric feature, whether the droopy upper eyelid is vision impairing or not, or whether the droopy upper eyelid is more likely vision impairing than not vision-impairing.

7. The system of claim 6, wherein the least one geometric feature of the pupil comprises the following: the pupil curvature; the pupil diameter; a pupil area visible in the image; or any combination of the aforesaid.

8. The system of claim 5, wherein the at least one geometric feature of the pupil includes a pupil area visible in the image.

9. The system of claim 6, wherein the determining whether the upper eyelid is droopy comprises:

determining a distance D between a center C of the pupil and a feature of the upper eyelid.

10. The system of claim 5, comprising determining a Marginal Reflex Distance Test 1.

11. The system of claim 6, wherein the position of center C of the pupil in a captured image frame may be determined based on light reflected from the pupil.

12. The system of claim 5, further providing indicators regarding a desired body posture of the subject relative to a camera during the capturing of images of one or more facial features of the subject for generating image data descriptive of the one or more facial features.

13. The system of claim 5, wherein the processing of the image data is performed by one of the following:

a trained machine-learning (ML) model;

a rule-based model;

a deterministic model;

or any combination of the aforementioned.

14. A system for identifying vision-impairing droopy eyelid, the system comprising:

a user interface device;

at least one processor, at least one memory, and one or more code sets stored in the at least one memory and executable by the at least one processor for performing:

receiving, from at least one camera, image data captured by a camera under different lighting conditions and descriptive of one or more facial features, wherein the different lighting conditions are configured to compel the subject to open the eyes widely in low intensity lighting and squint in high intensity lighting;

processing, by the processor, the image data for determining whether a droopy upper eyelid is due to subject malingering or not; and providing, by the user interface device, an output indicating whether an upper eyelid identified as droopy is due to malingering or not.

15. The system of claim 14, further configured to detect patient malingering by taking into consideration one or more body postures of the subject relative to the camera employed for generating the image data.

16. The system of claim 14, wherein the system is further configured for:

receiving image data descriptive of one or more facial features imaged in the visible and the infrared wavelength range for determining whether a droopy eyelid is due to patient malingering or not.

17. The system of claim 14, comprising determining a Marginal Reflex Distance Test 1.

18. The system of claim 14, wherein the droopy eyelid is classified by comparing features of one eye with features of the other eye of the same patient.

19. The system of claim 14, further configured to determine a rate of prolapse of an upper eyelid identified as droopy.

20. The system of claim 19, configured to determine, based on the prolapse rate, a probability of future vision impairment of the subject.

* * * * *